R. TYRELL.
COMBINED AUTOMOBILE FENDER AND LAMP SUPPORT.
APPLICATION FILED MAY 28, 1912.
1,049,946.
Patented Jan. 7, 1913.
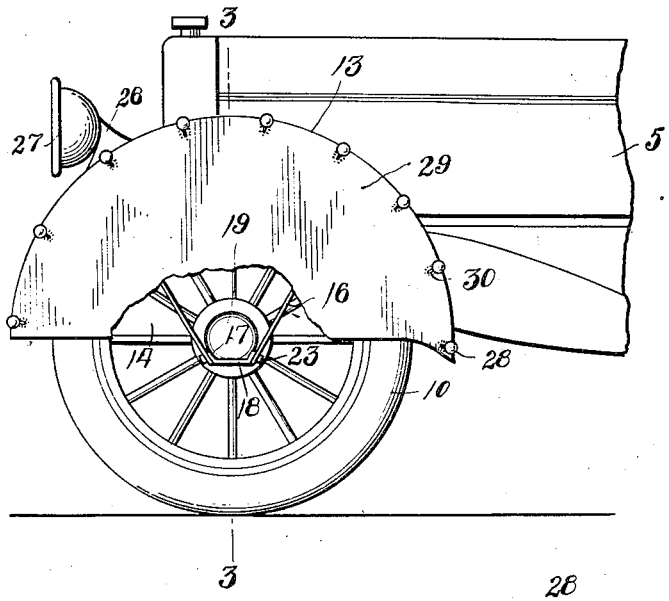
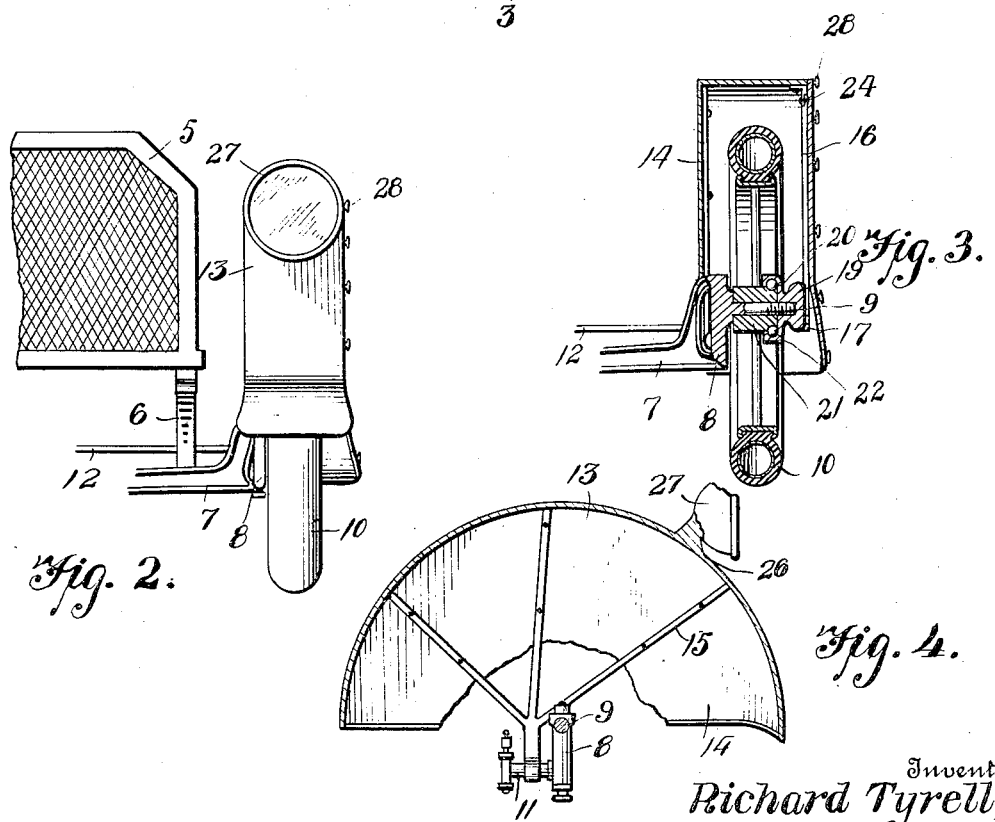

UNITED STATES PATENT OFFICE.

RICHARD TYRELL, OF MISSOULA, MONTANA.

COMBINED AUTOMOBILE FENDER AND LAMP-SUPPORT.

1,049,946.  Specification of Letters Patent.  Patented Jan. 7, 1913.

Application filed May 28, 1912. Serial No. 700,253.

*To all whom it may concern:*

Be it known that I, RICHARD TYRELL, a citizen of the United States, residing at Missoula, in the county of Missoula and State of Montana, have invented new and useful Improvements in Combined Automobile Fenders and Lamp-Supports, of which the following is a specification.

The invention relates to an attachment for motor vehicles, and more particularly to the class of combined automobile fenders and lamp supports.

The primary object of the invention is the provision of a fender or mud guard, wherein on the turning of the front wheels of an automobile or other motor vehicle, the guards or fenders will simultaneously turn therewith in the direction of travel of the wheels, so as to prevent the splashing of mud or water either on the body of the vehicle or upon the occupants therein.

Another object of the invention is the provision of a fender in which the head lamps are supported thereby, so that the light from the lamps will follow the direction of travel of the wheels, irrespective of the direction of travel of the body of the vehicle, as the fender will simultaneously turn therewith in the same direction, thus enabling the light to be thrown at all times from the lamps in the direction of movement of the vehicle.

With these and other objects in view, the invention consists in the construction, combination and arrangement of parts, as will be hereinafter more fully described, illustrated in the accompanying drawings, and pointed out in the claim hereunto appended.

In the drawings, Figure 1 is a fragmentary side elevation of a motor vehicle, showing the fender and lamp constructed in accordance with the invention. Fig. 2 is a fragmentary front elevation of the same. Fig. 3 is a vertical transverse sectional view on the line 3—3 of Fig. 1. Fig. 4 is a vertical longitudinal sectional view with the front wheel removed.

Similar reference characters indicate corresponding parts throughout the several views of the drawings.

Referring to the drawings by numerals, 5 designates a portion of the body of a motor vehicle, which is of the ordinary well-known construction, the same being supported in the usual manner upon springs 6, only one being shown, and is connected to a stationary front axle 7, the latter being formed with a turning knuckle 8 having a front axle spindle 9, upon which is journaled the front turning wheel 10, the knuckle 8 being of the ordinary well-known construction, and is formed with a rearwardly extending arm 11, to which is pivoted the usual cross coupling rod 12, the same extending to and is connected to the arm of the turning knuckle (not shown) at the opposite side of the vehicle, so that both of the front wheels will turn in unison and in the same direction with respect to each other.

The turning of the front wheels of the vehicle is effected by any suitable steering mechanism (not shown).

Disposed over the upper half of the wheel 10 is a fender, comprising an upwardly bowed or arcuately-shaped guard body 13 formed with an inner side wall 14, the said body being supported by means of inner and outer brace arms 15 and 16, respectively, the arms 15 being preferably three in number and have their lower ends joined to each other and suitably fixed to the arm 11 of the steering knuckle 8, the upper ends of the braces 15 being secured to the body 13 in any suitable manner. The outer braces 16, at their upper ends, are suitably secured to the guard body 13, while their lower ends are detachably connected to lugs 17 formed at opposite ends of a bearing 18, the same being formed integral with a detachable cap 19 threaded upon the outer end of the spindle 9, the cap being formed with an annular flange 20, between which and the outer end of the hub 21 of the front wheel 10 are interposed bearing balls 22, the same being held in suitable raceways formed in the said flange 20 of the cap 19, and the hub 21, respectively. The lower ends of the braces 16 carry locking screw members 23 which detachably engage in the lugs 17, while the said braces 16, near their upper ends, are formed with hinged joints 24, so that the braces may be swung outwardly when the screw members 23 are detached from the lugs 17, thereby permitting the wheel 10 to be readily removed from the spindle 9, should it be desired to repair the wheel or the tire thereon.

Formed on the top semi-circular wall of the guard 13, forwardly of the axis of the spindle 9, is a bracket 26, carrying a head lamp 27, of any ordinary well-known construction, the lighting of the lamp being effected in any ordinary well-known manner.

It will be evident that on turning the front wheel 10, the fender or mud guard will be turned simultaneously therewith, and likewise the lamp, so that the light thrown therefrom will be directed in the path of travel of the wheel, the guard serving to prevent the splashing of dirt or water upon the vehicle body or the occupants thereof, during the travel of the vehicle.

Formed at the outer edge of the guard 13, at suitable intervals, are buttons 28 supporting the water-proof outer covering 29, the said covering being provided with button holes 30 for receiving the buttons 28, so that in this manner the wheel will be inclosed throughout the upper half thereof.

From the foregoing, taken in connection with the accompanying drawings, it is thought that the construction, and operation of the invention will be readily understood, without requiring a more extended explanation.

What is claimed is:—

The combination with the front steering knuckle of a motor vehicle, a turning arm on the knuckle, and a wheel mounted upon the spindle, of a fender having connection with the turning arm at the inner side of the wheel, a cap on the outer end of the spindle, a bearing formed on the said cap, and braces hinged to the fender and detachably connected with the bearing.

In testimony whereof I affix my signature in presence of two witnesses.

RICHARD TYRELL.

Witnesses:
F. S. FISHER,
E. ROBERTSON.